United States Patent
Lai et al.

(10) Patent No.: US 6,947,365 B2
(45) Date of Patent: Sep. 20, 2005

(54) METHOD FOR PROTECTING PHASE LOCK LOOP IN OPTICAL SYSTEM

(75) Inventors: Yi-Lin Lai, Kee-Lung (TW); Sung-Hung Li, Junghe (TW)

(73) Assignee: VIA Technologies, Inc., Taipei (TW)

( * ) Notice: Subject to any disclaimer, the term of this patent is extended or adjusted under 35 U.S.C. 154(b) by 487 days.

(21) Appl. No.: 10/291,674

(22) Filed: Nov. 12, 2002

(65) Prior Publication Data

US 2003/0091350 A1 May 15, 2003

(30) Foreign Application Priority Data

Nov. 9, 2001 (TW) ........................................ 90127962 A

(51) Int. Cl.[7] ................................................. G11B 7/00
(52) U.S. Cl. .................. 369/59.2; 369/59.1; 369/47.28
(58) Field of Search ........................... 369/53.34, 59.19, 369/59.2, 47.28

(56) References Cited

U.S. PATENT DOCUMENTS

| | | | | |
|---|---|---|---|---|
| 5,003,557 A | * | 3/1991 | Fujiyama | .................... 375/357 |
| 5,661,172 A | * | 8/1997 | Colpaert et al. | ............ 514/402 |
| 6,185,172 B1 | * | 2/2001 | Nakazawa | ................ 369/47.46 |
| 6,269,058 B1 | * | 7/2001 | Yamanoi et al. | .......... 369/47.28 |

* cited by examiner

*Primary Examiner*—Aristotelis M. Psitos
(74) *Attorney, Agent, or Firm*—Rabin & Berdo, P.C.

(57) ABSTRACT

A method for protecting a phase lock loop (PLL) in an optical system is disclosed. The disclosed method will determine whether the currently reading data is erroneous and then maintain the frequency currently locked by the PLL circuit when the waveform lengths of the EFM signal in a detecting window contain at least one waveform length longer than 11T and at least one waveform length shorter than 3T. Otherwise, the PLL circuit will adjust the locked frequency according to the waveform length of the detected EFM signal so that the system clock frequency can be adjusted based on the locked one. In addition, when the optical system seeks tracks for reading required data under a constant angular velocity (CAV) modulation mode, the PLL circuit will increase the locked frequency gradually as the pick-up head moves towards the outer tracks of the optical disc, and decrease the locked frequency gradually as the pick-up head moves towards the inner tracks of the optical disc. Time cost for adjusting the system clock frequency can be significantly decreased based on the disclosed method.

18 Claims, 4 Drawing Sheets

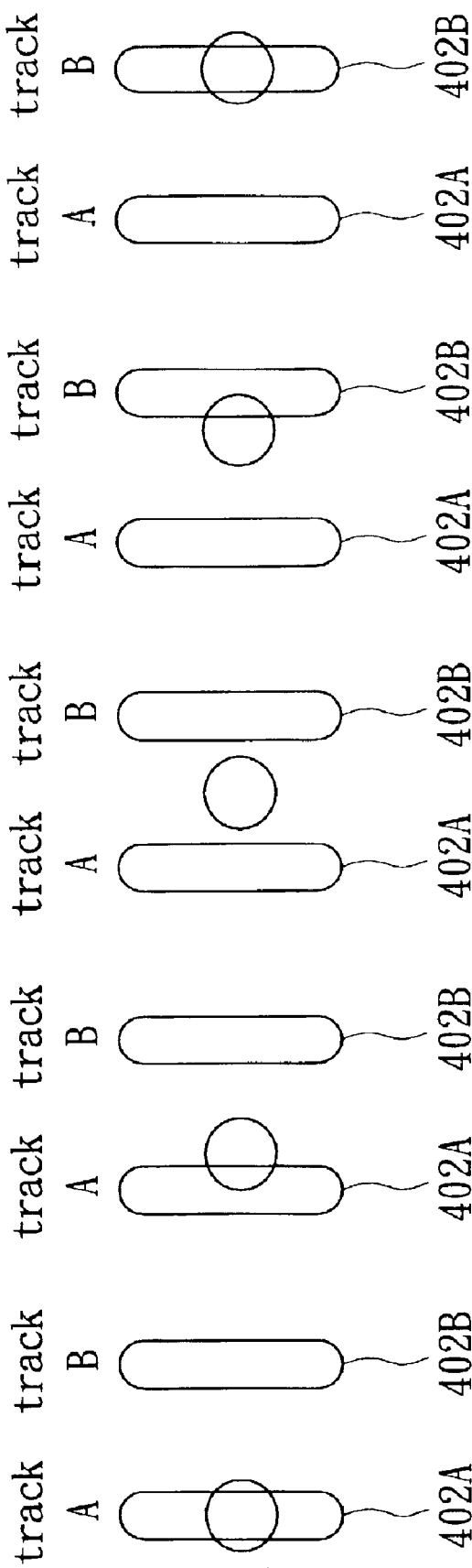

METHOD FOR PROTECTING PHASE LOCK
LOOP IN OPTICAL SYSTEM

CROSS-REFERENCE TO RELATED APPLICATION

This application incorporates by reference of Taiwan application Serial No. 090127962, filed on Nov. 9, 2001.

BACKGROUND OF THE INVENTION

1. Field of the Invention

This invention relates in general to a method for protecting a phase lock loop (PLL) in an optical system. More particularly, the invention relates to a method for protecting a phase lock loop being capable of preventing the optical system from malfunctions caused by abnormally performing frequency locking and adjustment operations when error data is read. Additionally, the disclosed method is adapted to an optical system under a constant angular velocity (CAV) modulation mode that the system can reduce the operating time when adjusting system clock frequencies under seeking mode.

2. Description of Related Art

Many optical systems, such as optical drives, optical writers, digital optical drives or high-speed readable/rewritable optical drives, are subsequently commercialized as technologies being highly developed. An optical disc is a known portable storage media having a storage capacity larger than a floppy disk, which makes the optical disc becomes widely used media for storing information now. Basically, pits and lands recorded on the spiral tracks of the optical disc are used to represent data stored thereon. In general, the optical system has to obey a certain rule for ensuring the accuracy of the accessed data in order to prevent itself from reading error data or from failing to access correct data due to misalignment to the spiral tracks under following mode. Conventionally, the waveform lengths of the EFM signal should be constrained between three system-clock periods (3T) and eleven system-clock periods (11T), while a PLL circuit is a widely used one in the optical system for locking the frequency of the system clock so as to achieve the purpose of controlling the waveform lengths of the EFM signal.

According to the conventional technology for locking the waveform lengths of the EFM signal, when the accumulated times that the waveform lengths of the EFM signal within a detecting window longer than 11 system clock periods has reached a preset threshold, the frequency locked by the PLL circuit will be decreased in the next detecting window. In contrary, when there is no EFM signal having waveform length exceeding 11T, the frequency locked by the PLL circuit will be increased in the next detecting window. Therefore, all data stored in the optical disc can be correctly accessed since the system clock frequencies can be properly adjusted. Conventionally, the detecting window can be 1~8 frames and each frame contains 588 system clock periods (588T).

For example, the system clock SYS_CLK in FIG. 1 is generated and used for detecting the EFM signal in the optical system such as an optical drive, while the EFM signal is described as series EFM_DATA_A~EFM_DATA_C in FIG.1. Additionally, the preset threshold is assumed to be three (3), that is, the frequency of the system clock SYS_CLK has to be decreased when the waveform lengths of the EFM signal longer than 11T has reached three times (i.e., the preset threshold). In the following description, the waveform lengths of the EFM signal before Ti is assumed to be shorter than 11T.

In FIG. 1, when the system clock SYS_CLK samples the EFM_DATA_A series, assume that the EFM signal having a waveform length longer than 11T occurs in consecutive system clock periods Ti+1~Ti+14. Next, the system clock SYS_CLK samples the EFM_DATA_A series and then detects the EFM waveform lengths in Tj+1~Tj+12 (indicated by numeral 102B) and Tk+2~Tk+16 (indicated by numeral 102C) are longer than 11T, wherein the waveform lengths in 102B and 102C are 12T and 15T respectively. Because the accumulated times regarding the waveform lengths of the EFM signal longer than 11T has reached three times (indicated by 102A, 102B and 102C), the optical system will decrease the frequency of SYS_CLK in the next detecting window. On the other hand, there is no detected waveform length in the EFM_DATA_B series being longer than 11T when the system clock SYS_CLK samples the EFM_DATA_B waveform. For example, the waveform lengths in Ti+3~Ti+13 (indicated by 104A), Tj+1~Tj+5 (indicated by 104B), Tk+1~Tk+9 (indicated by 104D) and Tk+9~Tk+16 (indicated by 104C) are 10T, 5T, 8T, 9T and 8T, respectively. Because there is no waveform length longer than 11T in the EFM_DATA_B series, the optical system will increase the frequency of SYS_CLK in the next detecting window. Continuing the above processes, the frequency locked by the PLL is adjusted when the EFM signal having too short or too long waveforms over predetermined thresholds, so as to maintain the waveform lengths of the EFM signals between 3T and 11T.

The conventional approach obviously only monitors whether the waveform lengths of the EFM signal exceed 11T and fails to determine the accuracy of the EFM signal. Therefore, malfunctions may be arisen when the PLL adjusts the locked frequency based on the wrong EFM signal derived from incorrect data. For example, when the system clock SYS_CLK samples the EFM_DATA_C series, the first detected waveform length of the EFM signal longer than 11T will occur in the thirteen system clock periods Ti+1~Ti+13 (indicated by numeral 106A). Next, the optical system will find that the waveform lengths of Tj+1~Tj+12 (indicated by numeral 106B) and Tk+3~Tk+15 (indicated by numeral 106D) in EFM_DATA_C are longer than 11T when the EFM_DATA_C series being continuously sampled. Based on the algorithm of the prior art scheme, because the waveform lengths longer than 11T in the EFM_DATA_C has reached three times (respectively indicated by 106A, 106B and 106D), the optical system will decrease its system clock frequency for the next detecting window. However, when looking closer to the EFM_DATA_C series, it is obvious that the waveform lengths in both Tk+2~Tk+3 (indicated by numeral 106C) and Tk+16~Tk+17 (indicated by numeral 106E) periods are only 2T, which obviously do not comply with the data storage specification for the optical disc. Namely, the currently read data might be error or damaged. At this time, if the optical system decreases its system clock frequency, the PLL might be suddenly slowed down, which may cause unnecessary resource and time costs.

Furthermore, the conventional scheme will terminate the PLL operation firstly when the optical system needs to seek tracks for accessing required data, until the pick-up head completes the track-seeking operation. Therefore, the data access will not be performed until the PLL becomes stable, which evidently enlarges operation time under seeking mode. As a result, there is a need to provide a method being capable of eliminating disadvantages of the traditional approach, which can avoid incorrect adjustment operations regarding system clock frequency caused by error data, and can also upgrade the performance under the seeking mode.

SUMMARY OF THE INVENTION

According to the foregoing description, an object of this invention is to provide a method for protecting the PLL in the optical system by avoiding incorrectly frequency adjustment operations arisen from accessing error data.

It is another object of the invention to provide a method capable of locking the system clock frequency more quickly than before when the optical system seeks required tracks for reading data.

According to one embodiment, the disclosed method will determine the current detecting window to be a defect one when the waveform lengths of the EFM signal read from the optical disc in this detecting window contain at least one waveform length longer than eleven system clock periods (11T) and at least one waveform length shorter than three system clock periods (3T), simultaneously. Therefore, the frequency locked by the PLL will be maintained within the next detecting window. In addition, when the accumulated times that the waveform lengths are longer than 11T in the detecting window has reached a predetermined threshold, the system clock frequency will be decreased in the next detecting window. Furthermore, when all waveform lengths of the EFM signal in the detecting window are shorter than 11T, the system clock frequency will be increased in the following detecting window.

The disclosed method is adapted to an optical system operated under a constant angular velocity (CAV) mode. When this optical system seeks tracks for reading required data, its PLL circuit will correctly lock frequency only if the EFM signal contains correct data, and will halt its operations when error data is accessed. Therefore, the PLL will increase the locked frequency gradually as the pick-up head moves towards the outer tracks of the optical disc, and decrease the locked frequency gradually as the pick-up head moves towards the inner tracks. Because the PLL does not halt its frequency-locking operations completely, the time cost for adjusting the system clock can be decreased than the conventional.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

FIGS. 4A~4E show an exemplary diagram illustrating the alignment situations of the pickup head when the optical system performs under seeking mode.

DESCRIPTION OF THE PREFERRED EMBODIMENT

Figure 1:
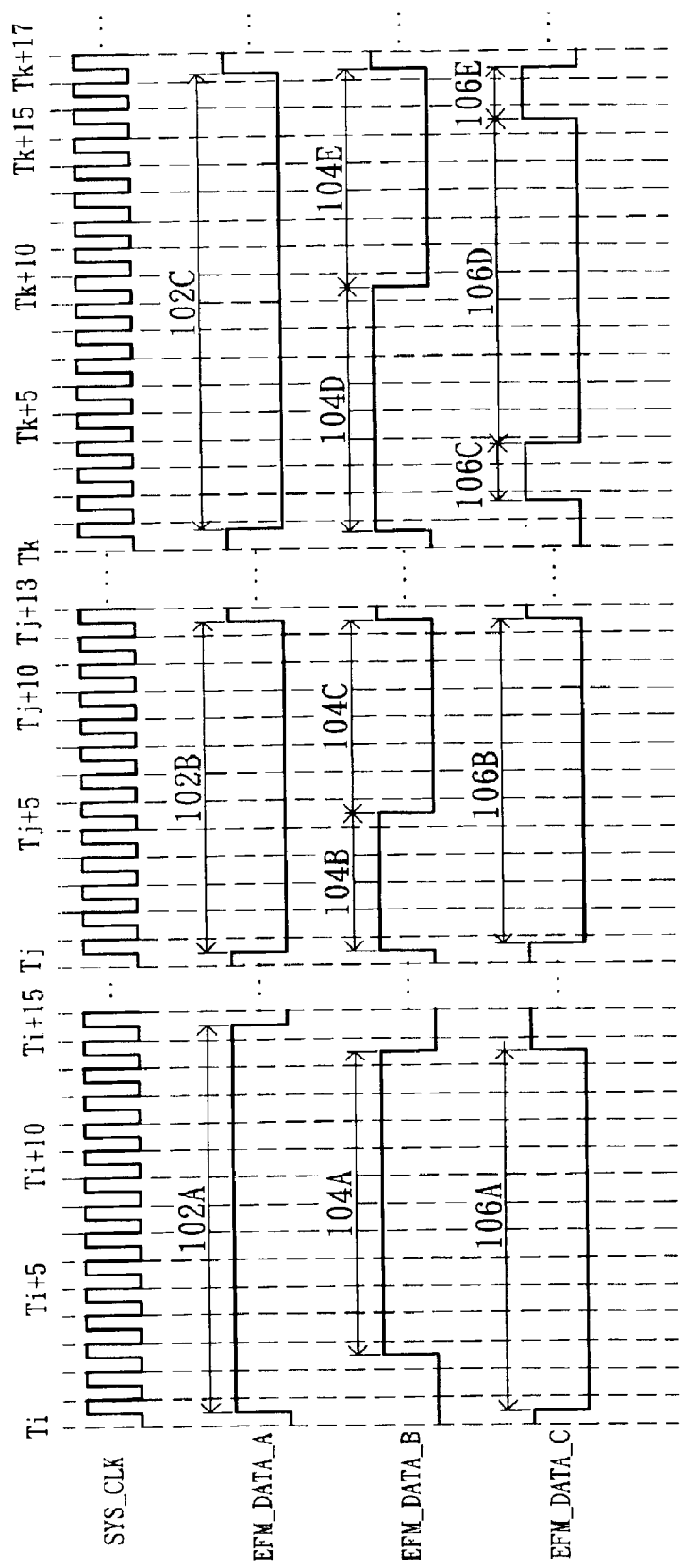
FIG. 1 shows a timing diagram illustrative of the waveform variations of the EFM signals when reading an optical disc.
Figure 2:
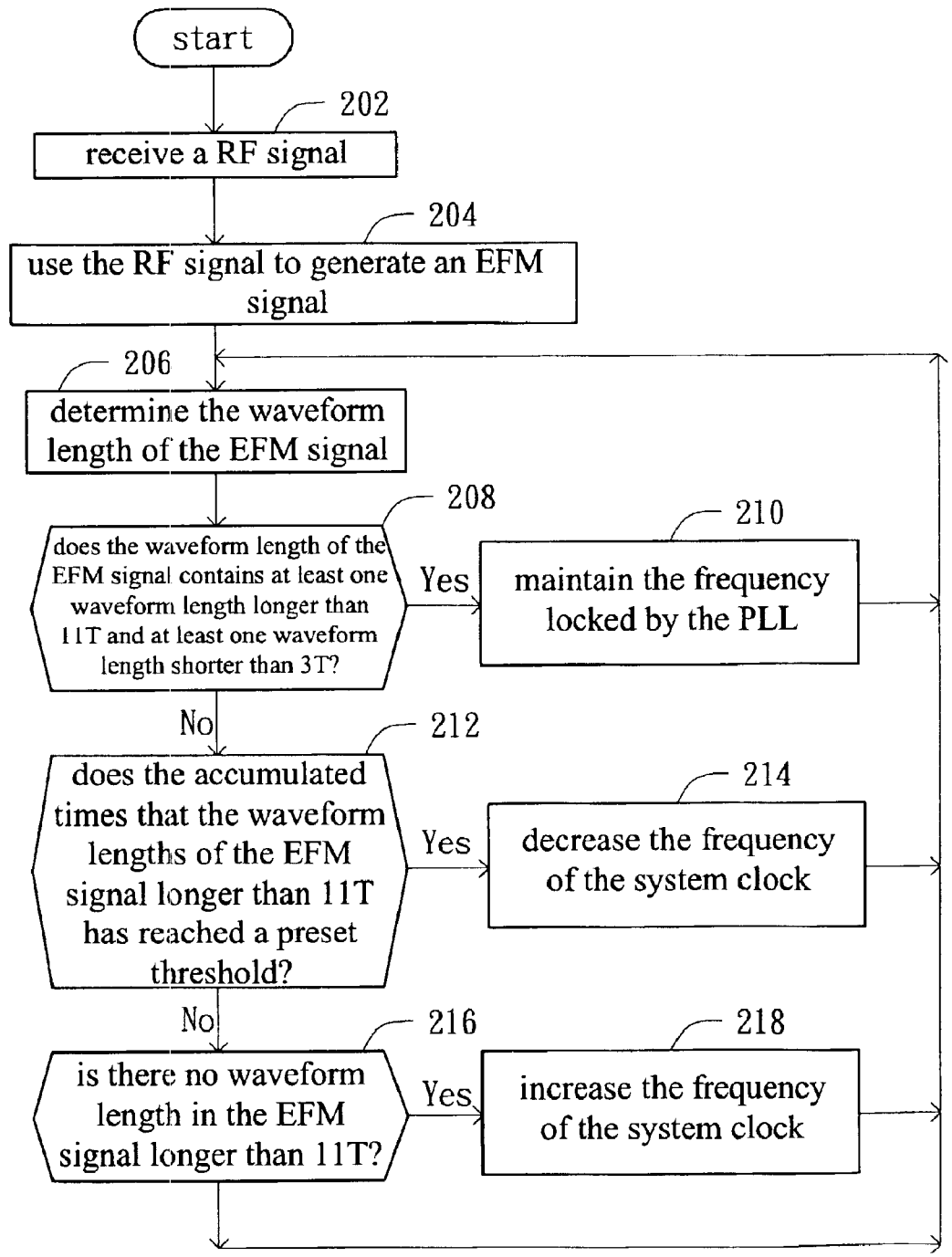
FIG. 2 is a flow chart showing the operating processes according to one preferred embodiment of the invention.

FIG. 2 shows a flow chart of the disclosed method according to one preferred embodiment of the invention. The optical system employs an equalizer to manipulate RF signal when accessing information from an optical disc (step 202). An EFM (eight-to-fourteen modulation) signal, which contains an equalized signal and a timing signal regarding the equalized signal, is then derived from the received RF signal (step 204). The EFM signal, which is transmitted to the PLL circuit to generate series EFM_DATA_A ~EFM_ DATA_C as shown in FIG. 1, is used for determining the waveform lengths of the EFM signal (step 206). When the waveform lengths of the EFM signal within a detecting window contains simultaneously at least one waveform length longer than 11T and at least one waveform length shorter than 3T, the frequency locked by the PLL will be frozen and maintained because the currently accessed data is erroneous. Accordingly, the system clock is operated under the original frequency in the next detecting window, i.e., the system clock frequency referenced in the next detecting window is as the same as the one of the current detecting window (step 210). On the other hand, when the accumulated times regarding waveform lengths in EFM signal longer than 11T achieves a preset threshold (for example, 3 times in the embodiment) at step 212, the PLL will be activated for adjusting the locked frequency, while the locked frequency will be lowered and used in the next detecting window (step 214). Furthermore, when none of the above waveform lengths are longer than 11T (step 216), the PLL will be activated to adjust and increase the locked frequency. The new derived frequency is then used in the next detecting window (step 218).

In practice, the operational method in FIG. 2 can be programmed and then stored in a phase-frequency detector of the PLL, so that there is no additional modification required for the circuit or hardware of the PLL circuit, or even the optical system. The predetermined threshold used for increasing the locked frequency can be set according to various applications. At step 208, an additional threshold, which is associated with the accumulated times that the erroneous data (including waveform lengths longer than 11T and shorter than 3T) occur in the detected waveform lengths, can be set as various applications. If the accumulated occurrence times that the waveform lengths is at least equal to the additional threshold, the current detecting window will be determined as a defect one having error data therein. Of course, the criteria regarding the additional threshold, including the threshold value and whether the additional threshold is employed or not, should depend on various applications.

The method of the invention can also upgrades the performance when seeking data across spiral tracks. The alignment process regarding the pick-up head of the optical system is skeleton described by using FIGS. 4A~4E. FIG. 4A shows that the pick-up head tracks on the center of the track A, and FIG. 4E shows that the pick-up head tracks on the center of the track B. FIGS. 4B~4D show the alignment processes of the pick-up head when crossing tracks, wherein numerals 402A and 402B represent pits recorded on the tracks A and B, respectively. The pick-up head illuminates a laser beam to the optical disc and then receives the reflected light beam from the optical disc, so that an EFM signal can be generated for determining the data read from the optical disc. Basically, a valley will be formed on the EFM signal when the laser beam projecting to a pit, while a deeper valley is obtained when a larger pit area is projected by the laser beam (when the depth of the valley reaches the maximum, the depth of the valley will not increase, as shown by the numeral 310). In the beginning of the seeking mode (i.e., the pickup head starts to seek tracks for reading data), the pit area projected by the laser beam will be getting smaller, as shown in FIGS. 4B and 4C. As a result, the valley on the EFM signal becomes shallower gradually. Additionally, the shallowest location of the valley will be obtained when the pick-up head arrives at the land between tracks A and B, as shown in FIG. 4C. As the pick-up head crosses the track continuously, the illuminated laser beam will be directed to the next track gradually, as shown in FIGS. 4D and 4E, which makes the valley formed on the EFM signal getting deeper. Therefore, the timing diagram regarding the seeking mode will be quite similar as the one shown in FIG. 3A.

Figure 3A:
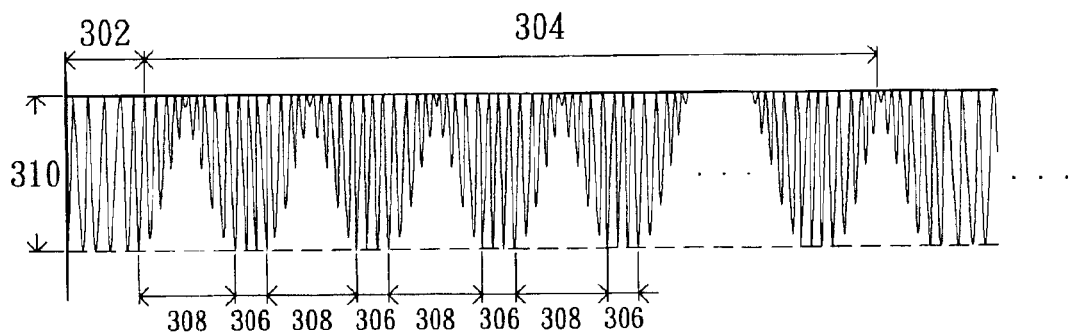
FIG. 3A is a timing diagram showing the waveform variations of the EFM signals when the optical system seeks tracks for reading data.

In FIG. 3A, the interval 302 represents a waveform diagram of the RF signal when the optical system accesses data from a data track under a seeking mode. FIG. 3A is a macroscopic view of FIG. 1 after equalization processes. On the other hand, the interval 304 represents waveforms of the RF signal when the optical system seeks spiral tracks for accessing required data. In fact, the pick-up head keeps illuminating the laser beam even the optical system is crossing tracks, so that the pick-up head will sometime substantially align to the center of the data track, such as the area 306. Therefore, the PLL can perform frequency adjustment operations according the above information (such as the operations at steps 214 or 218) because the EFM signal will follow the spec of 3T and 11T when the pick-up head receives the reflected light beam from the area 306. For example, as shown in FIGS. 4A~4E, when the pick-up head crosses from the track A, the track B to the track C (not shown) for reading data. However, when the pick-up head positions at the location shown in FIG. 4E, the data read from the track B is correct (i.e., the EFM signal will follow the spec of 3T and 11T) although the data on the track B is not currently demanded. The frequency locked by the PLL may be adjusted according to EFM associated with the track B (step 214 or 218). It should be noted that when the data accessed by the pick-up head of the optical system is not correct, such as the area 308 (the location of the pick-up head might be shown in FIGS. 4B~4D), the PLL will maintain the locked frequency and do not perform any frequency adjustment operation (step 210). Accordingly, when the optical system crosses the spiral track to read data under a constant angular velocity (CAV) modulation mode, the PLL will increase the locked frequency gradually as the pick-up head moves towards the outer tracks of the optical disc, and decrease the locked frequency gradually as the pick-up head moves towards the inner tracks of the optical disc. In this way, the system clock frequency can be gradually adjusted according to the frequency locked by PLL. Because the PLL is not completely halted in the embodiment, the time cost for adjusting the system clock frequency can be degraded, which indicates that the operation speed of the optical system can be further increased.

Figure 3B:
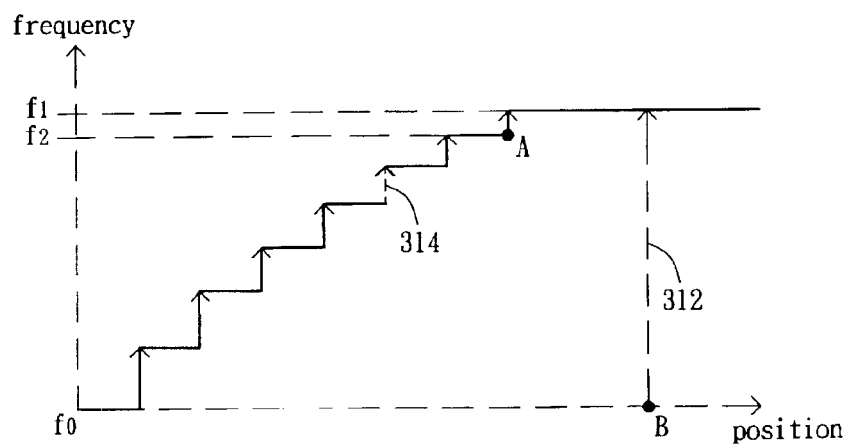
FIG. 3B shows diagrams for adjusting the frequency according to the conventional approach and the disclosed method when the PLL of the optical system seeks tracks for reading data.

For example, FIG. 3B shows an exemplary diagram that the frequency is increased from f0 to f1 when the pick-up head of the optical system crosses from an inner track to an outer track for reading data. As noted, the frequency adjustment trajectory of the conventional approach under seeking mode is shown by the numeral 312, while a numeral 314 indicates the frequency adjustment trajectory according to the embodiment under seeking mode. In the embodiment, the PLL circuit can perform frequency adjustment operations when its pickup head positions beneath the area 306, therefore the frequency locked by the PLL circuit will be gradually increased. At the end of frequency adjustment operations, the optical system only has to increase the frequency (f2) at the point A up to the frequency f1, which indicates that the time required for locking the frequency is very short. On the other hand, because the PLL circuit cannot be activated until the pick-up head completes the track-crossing operation, the operation for locking frequency in the conventional scheme will be started from the point B, i.e., the frequency f0, so that the operational time for the prior art scheme is longer than that of the present invention.

The disclosed method offers several advantages as follows. Firstly, the disclosed method can detect data correctness and adjust the locked frequency of the PLL simultaneously. When the length of the EFM signal in a detecting window contains simultaneously at least one waveform length longer than 11T, and at least one waveform length shorter than 3T, the frequency locked by the PLL is maintained for preventing the optical system from being affected by mal-operations of the PLL. Secondly, the invention is also usable for the CAV mode. When the optical system crosses the spiral tracks for reading data, the PLL circuit will increase the locked frequency gradually as the pick-up head moves towards the outer tracks, while the locked frequency will be gradually decreased as the pick-up head moves towards the inner tracks. In this way, the system clock can be adjusted according to the frequency locked by PLL circuit.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What is claimed is:

1. A method for protecting a phase lock loop (PLL) in an optical system, comprising steps of:
   reading an optical disc to generate an EFM signal;
   acquiring a plurality of waveform lengths of the EFM signal contained in a detecting window to determine whether the currently detecting window is a defected one;
   maintaining a locked frequency of the PLL when the currently detecting window is determined to be a defected one; and
   adjusting the locked frequency according to the determining results regarding the waveform lengths of the EFM signal.

2. The method of claim 1, wherein the currently detecting window is determined to be a defected one when the currently detecting window comprises at least one waveform length longer than eleven system-clock periods (11T) of the optical system and at least one waveform length shorter than three system-clock periods (3T).

3. The method of claim 2, wherein the adjusting step comprises a step of:
   decreasing a system clock frequency of the optical system when an accumulated times of the waveform lengths longer than 11T has reached a threshold in the currently detecting window.

4. The method of claim 2, wherein the adjusting step comprises a step of:
   increasing a system clock frequency of the optical system when all of the waveform lengths in the currently detecting window are shorter than 11T.

5. The method of claim 1, wherein a program code of the method is stored in a phase-frequency detector in the PLL.

6. The method of claim 1, further comprising a step of:
gradually increasing a frequency locked by the PLL when a pick-up head of the optical system moves towards an outer track of an optical disc being read by the optical system currently.

7. The method of claim 1, further comprising a step of:
gradually decreasing a frequency locked by the PLL when a pick-up head of the optical system moves towards an inner track of an optical disc being read by the optical system currently.

8. The method of claim 1, wherein the optical system is an optical drive, an optically rewritable drive, a digital optical drive, or an optically readable/rewritable drive.

9. A method for protecting a phase lock loop (PLL) in an optical system, comprising steps of:
reading an optical disc to generate an EFM signal; and
acquiring a plurality of waveform lengths of the EFM signal contained in the currently detecting window to determine whether the currently detecting window is defected;
maintaining a frequency locked by the PLL when the currently detecting window is a defected one;
decreasing the frequency locked by the PLL when an accumulated times of the waveform lengths in the currently detecting window longer than a predetermined clock period has reached a threshold; and
increasing a frequency when all waveform lengths of the EFM signals in the detecting window are shorter than the predetermined clock period.

10. The method of claim 9, wherein a program code of the method is stored in a phase-frequency detector in the PLL.

11. The method of claim 9, further comprising a step of:
gradually increasing a frequency locked by the PLL when a pick-up head of the optical system moves towards an outer track of an optical disc being read by the optical system currently.

12. The method of claim 9, further comprising a step of:
gradually decreasing a frequency locked by the PLL when a pick-up head of the optical system moves towards an inner track of an optical disc being read by the optical system currently.

13. The method of claim 9, wherein the optical system is an optical drive, an optically rewritable drive, a digital optical drive, or an optically readable/rewritable drive.

14. The method of claim 9, wherein the currently detecting window is a defected one when the waveform lengths of the EFM signal in the currently detecting window comprises at least one waveform length longer than eleven system-clock periods (11T) and at least one waveform length shorter than three system-clock periods (3T), wherein the eleven system-clock periods is the predetermined clock period.

15. A method for protecting a phase lock loop (PLL) in an optical system, comprising steps of:
reading an optical disc to generate an EFM signal; and
acquiring a waveform length of the EFM signal contained in a currently detecting window;
maintaining a frequency locked by the PLL when the length of the EFM signal in the detecting window comprises at least one waveform length longer than eleven system-clock periods (11T) and at least one waveform length shorter than three system-clock periods (3T);
decreasing the locked frequency when the currently detecting window is not defected and an accumulated times of the waveform lengths longer than 11T in the currently detecting window has reached a threshold;
increasing the locked frequency when the currently detecting window is not defected and all of the waveform lengths of the EFM signals in the detecting window are shorter than 11T;
increasing the locked frequency gradually when a pick-up head of the optical system moves towards an outer track of an optical disc being read by the optical system currently; and
decreasing the locked frequency gradually when the pick-up head of the optical system moves towards an inner track op the optical disc being read by the optical system currently.

16. The method of claim 15, wherein a program code of the method is stored in a phase-frequency detector in the PLL.

17. The method of claim 15, wherein the optical system is an optical drive, an optically rewritable drive, a digital optical drive, or an optically readable/rewritable drive.

18. The method of claim 15, wherein the currently detecting window is determined to be a defect one when the locked frequency of the PLL is maintained for the next detecting window.

* * * * *